US012710079B2

(12) United States Patent
Shahin

(10) Patent No.: US 12,710,079 B2
(45) Date of Patent: Aug. 18, 2026

(54) CALIPER BRAKE

(71) Applicant: HL MANDO CORPORATION, Pyeongtaek-si (KR)

(72) Inventor: Hatem Shahin, Pfaffenhofen (DE)

(73) Assignee: HL MANDO CORPORATION, Pyeongtaek si (KR)

( * ) Notice: Subject to any disclaimer, the term of this patent is extended or adjusted under 35 U.S.C. 154(b) by 426 days.

(21) Appl. No.: 18/368,331

(22) Filed: Sep. 14, 2023

(65) Prior Publication Data

US 2024/0271671 A1 Aug. 15, 2024

(30) Foreign Application Priority Data

Feb. 14, 2023 (KR) ........................ 10-2023-0019468

(51) Int. Cl.
*F16D 55/226* (2006.01)
*F16D 65/095* (2006.01)
*F16D 55/00* (2006.01)

(52) U.S. Cl.
CPC ......... *F16D 55/226* (2013.01); *F16D 65/095* (2013.01); *F16D 2055/0016* (2013.01)

(58) Field of Classification Search
CPC ................. F16D 55/226; F16D 65/095; F16D 2055/0016
USPC ....................................................... 188/73.39
See application file for complete search history.

(56) References Cited

U.S. PATENT DOCUMENTS

| | | | |
|---|---|---|---|
| 3,366,200 A * | 1/1968 | Hayes | B60T 1/065 188/73.31 |
| 5,022,500 A * | 6/1991 | Wang | F16D 65/0979 188/73.31 |
| 5,467,847 A * | 11/1995 | Antony | F16D 55/227 188/73.43 |
| 6,039,155 A * | 3/2000 | Demoise, Jr. | F16D 65/095 188/73.39 |
| 9,285,002 B2 * | 3/2016 | Iraschko | B60T 1/065 |
| 9,441,685 B2 * | 9/2016 | Iraschko | F16D 55/226 |
| 9,803,707 B2 * | 10/2017 | Halfmann | F16D 65/092 |
| 2009/0236187 A1 * | 9/2009 | Bach | F16D 65/095 188/250 R |
| 2014/0124306 A1 | 5/2014 | Chelaidite | |
| 2018/0017116 A1 * | 1/2018 | Abt | F16D 65/183 |
| 2025/0207645 A1 * | 6/2025 | Stoeger | F16D 65/097 |

FOREIGN PATENT DOCUMENTS

| | | | |
|---|---|---|---|
| KR | 10-0471916 B1 | 3/2005 | |
| KR | 10-2012-0131077 A | 12/2012 | |
| KR | 10-2018-0059083 A | 6/2018 | |
| KR | 20250071568 A * | 5/2025 | F16D 55/225 |

* cited by examiner

*Primary Examiner* — Christopher P Schwartz
(74) *Attorney, Agent, or Firm* — LEE, HONG, DEGERMAN, KANG & WAIMEY

(57) ABSTRACT

Disclosed herein is a caliper brake including a disk that rotates together with a wheel, a pair of pad plates disposed on both sides of the disk, respectively, and a carrier that is fixed to a vehicle body and accommodates the pair of pad plates therein, wherein the pair of pad plates include protrusions protruding from both side ends thereof, and the carrier includes a slide groove that is recessed from the inner surface to the outer side thereof so that the protrusions are inserted and supported, and is recessed to be inclined in a reciprocating direction so that the pair of pad plates are slidable diagonally.

6 Claims, 5 Drawing Sheets

CALIPER BRAKE

CROSS-REFERENCE TO RELATED APPLICATION

This application claims the benefit of Korean Patent Application No. 10-2023-0019468, filed on Feb. 14, 2023, in the Korean Intellectual Property Office, the disclosure of which is incorporated herein by reference.

BACKGROUND

1. Field

Embodiments of the present disclosure relate to a caliper brake, and more specifically, to a caliper brake for preventing the deterioration in brake performance caused by thermal deformation of a disk.

2. Description of the Related Art

A vehicle essentially includes a brake system for braking. A typical brake system is a caliper brake. The caliper brake includes a disk that rotates together with a wheel of a vehicle, and a piston and brake pads that are mounted to the side surface of the disk and operated hydraulically or electronically.

Specifically, in the caliper brake, the piston moves inward when a driver depresses the brake pedal, and the brake pads clamp the disk inward to generate frictional force and utilize it as a braking force. In other words, the caliper brake stops the front and rear axles while converting the kinetic energy of the vehicle into thermal energy through friction between the brake pads and the disk.

The thermal energy generated by friction between the brake pads and the disk in the caliper brake is considerable. For example, in the case of the caliper brake including a large disk, the temperature of the disk may increase to 700° C., and the disk having increased temperature is thermally deformed.

In the conventional caliper brake, a disk, brake pads, and a pressing member are coaxially installed inside the caliper housing. Accordingly, when the disk is thermally deformed, the pressure provided by the pressing member is eccentrically generated, causing one-sided wear on the brake pads. This has caused limitations of a noise of the brake and reducing the brake performance and stability.

Therefore, there is a need for a method capable of responding to the occurrence of thermal deformation of the disk in the caliper brake.

RELATED ART DOCUMENT

Patent Document

Korean Patent No. 10-0471916 (registered on Feb. 3, 2005)

SUMMARY

Therefore, it is an aspect of the present disclosure to provide a caliper brake that prevents the deterioration in brake performance and stability due to the thermal deformation of a disk.

It is another aspect of the present disclosure to provide a caliper brake that prevents a noise of the brake caused by the thermal deformation of a disk.

It is still another aspect of the present disclosure to provide a caliper brake that prevents one-sided wear of brake pads due to the thermal deformation of a disk.

It is yet another aspect of the present disclosure to provide a caliper brake having a simple structure and improved productivity and assemblability of a product.

It is still yet another aspect of the present disclosure to provide a caliper brake capable of reducing costs of the brake and improving the marketability of a vehicle.

Additional aspects of the disclosure will be set forth in part in the description which follows and, in part, will be obvious from the description, or may be learned by practice of the disclosure.

In accordance with one aspect of the present disclosure, a caliper brake includes: a disk that rotates together with a wheel; a pair of pad plates disposed on both sides of the disk, respectively; and a carrier that is fixed to a vehicle body and accommodates the pair of pad plates therein. The pair of pad plates include protrusions protruding from both side ends thereof, and the carrier includes a slide groove that is recessed from the inner surface to the outer side thereof so that the protrusions are inserted and supported, and is recessed to be inclined in a reciprocating direction so that the pair of pad plates are slidable diagonally.

The slide groove may be provided in an inclined shape with a height that is lower as a distance from the vehicle body increases and a height that is higher as a distance from the vehicle body decreases.

The slide groove may be provided so that an inclined angle is formed to be 2° to 3° based on a horizontal line.

The caliper brake may further include a pressing member that presses, toward the disk, a pad plate disposed close to the vehicle body among the pair of pad plates, and the pressing member may be disposed to be inclined perpendicular to the pair of pad plates.

The caliper brake may further include: a pressing member that presses, toward the disk, a pad plate disposed close to the vehicle body among the pair of pad plates; and a caliper housing provided with a cylinder in which the pressing member is installed to be movable forward and backward, a finger provided to press, toward the disk, a pad plate disposed far from the vehicle body among the pair of pad plates, and a body that connects the cylinder to the finger. The finger may be disposed to be inclined so that an inner surface thereof in contact with the pad plate is perpendicular to the pair of pad plates.

The protrusions and the slide groove may be provided in plural.

The disk may be provided with at least one heat dissipation hole in a circumferential surface thereof.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
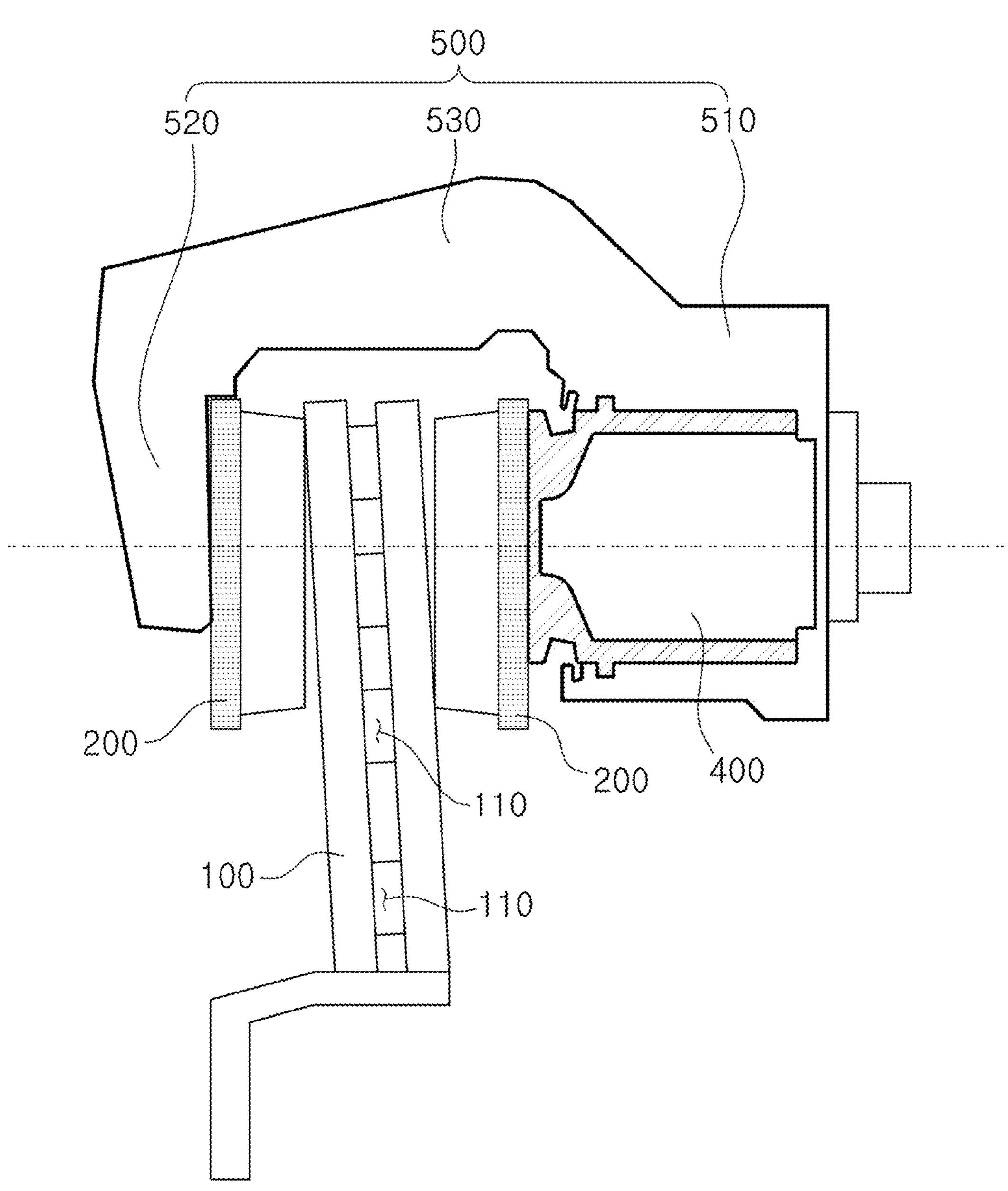
FIG. 1 is a cross-sectional view illustrating a state in which a disk is thermally deformed in a conventional caliper brake.

Hereinafter, embodiments of the present disclosure will be described in detail with reference to the accompanying drawings. The following embodiments are examples to provide the scope of the present invention to those skilled in the art. The present invention is not limited to the following embodiments and may be implemented in different forms. In the drawings, some portions not related to the description will be omitted and will not be shown in order to clearly describe the present disclosure, and also a size of a component may be somewhat exaggerated to help understanding.

Figure 2:
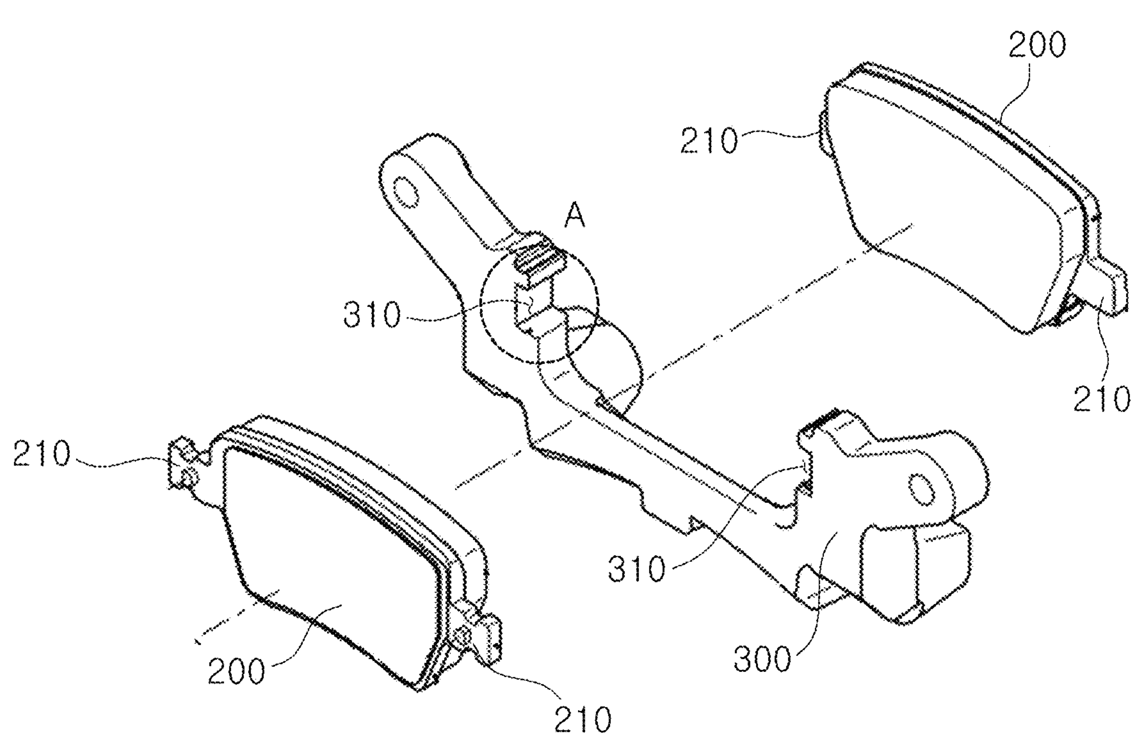
FIG. 2 is a perspective view illustrating a state before a pair of pad plates are mounted on a carrier in the conventional caliper brake.

FIG. 1 is a cross-sectional view illustrating a state in which a disk 100 is thermally deformed in a conventional caliper brake, and FIG. 2 is a perspective view illustrating a state before a pair of pad plates 200 are mounted on a carrier 300 in the conventional caliper brake.

Referring to FIGS. 1 and 2, the conventional caliper brake includes the disk 100, pad plates 200, a pressing member 400, a carrier 300, and a caliper housing 500.

The disk 100 is provided to rotate together with a wheel of a vehicle. A pair of pad plates 200 and a pair of brake pads are disposed on both sides of the disk 100. Specifically, an inner brake pad and an outer brake pad are disposed on both sides of the disk 100, respectively, and the inner brake pad and the outer brake pad are fixedly installed to an inner pad plate 200 and an outer pad plate 200, respectively. The brake pads are respectively attached to the inner surfaces (the surfaces facing the disk 100) of the respective pad plates 200.

The pressing member 400 may be disposed to be in contact with the inner pad plate 200 disposed close to the vehicle body among the pair of pad plates 200, and may press the inner pad plate 200 toward the disk 100.

The caliper housing 500 may be provided with a cylinder 510 in which the pressing member 400 is installed to be movable forward and backward, a finger 520 provided to press, toward the disk 100, the outer pad plate 200 disposed far from the vehicle body among the pair of pad plates 200, and a body 530 that connects the cylinder 510 and the finger 520.

The carrier 300 is fixed to the vehicle body and accommodates a pair of pad plates 200 therein.

The pair of pad plates 200 may include protrusions 210 protruding from both side ends thereof, and the carrier 300 may include a slide groove 310 recessed from the inner surface to the outer side thereof so that the protrusions 210 are inserted and supported. Accordingly, the protrusions 210 of the pair of pad plates 200 may be coupled to the slide groove 310 of the carrier 300 to slide in a reciprocating direction.

Accordingly, when the vehicle is braked, the pressing member 400 moves forward to press the inner pad plate 200 and the inner brake pad toward the disk 100 to come closely into contact with the disk 100, and due to reaction force with respect to this, the caliper housing 500 slides in a direction opposite to the forward direction of the pressing member 400 with respect to the carrier 300 fixedly installed on the vehicle body, so that the outer pad plate 200 and the outer brake pad installed in the caliper housing 500 may be pressed toward the disk 100 and brought closely into contact with the disk 100.

The temperature of the disk 100 increases due to frictional heat generated while the disk 100 is brought into contact with the brake pad when the vehicle is braked. Accordingly, at least one heat dissipation hole 110 is provided in the circumferential surface of the disk 100 to dissipate heat from the disk 100.

Meanwhile, the expressions "inner surface," "inner side," "outer surface," and "outer side" are used in the description of the embodiment of the present disclosure. In all configurations, the inner surface means a surface facing the disk 100, and the inner side means a direction facing the disk 100. On the other hand, in all configurations, the outer surface means a surface in a direction opposite to the surface facing the disk 100, and in all configurations, the outer side means a direction opposite to the direction facing the disk 100. For example, the expression that the slide groove 310 is recessed from the inner surface to the outer side of the carrier 300 may be understood as being recessed in an opposite direction from a surface close to a portion on which the disk 100 is mounted in the carrier 300, as illustrated in FIG. 2.

The protrusions 210 and the slide groove 310 may be provided in plural. This may improve the durability of the protrusions 210 and the slide grooves 310, and allows the pad plates 200 and the brake pads to stably move along the slide grooves 310 inside the carrier 300.

The thermal energy generated in the caliper brake by bringing the disk 100 into contact with the brake pad during the braking of the vehicle is considerable. For example, in the case of the caliper brake including the large disk 100, the temperature of the disk 100 may increase to 700° C., and the disk 100 having increased temperature may be thermally deformed.

In general, when the disk 100 is thermally deformed, the end of the disk 100 is bent toward the finger 520 of the caliper housing 500 due to the shape of the disk 100 and the pressing direction of the pressing member 400.

In the conventional caliper brake, as illustrated in FIG. 1, the pair of pad plates 200, the pair of brake pads, and the pressing member 400 are disposed in parallel with the x-axis like a dotted line, and the finger 520 of the caliper housing 500 has a surface in contact with the outer pad plate 200 in a direction perpendicular to the x-axis. In addition, the slide groove 310 of the carrier 300 is recessed in parallel with the x-axis such that the pair of pad plates 200 and the pair of brake pads move forward and backward in parallel with the x-axis.

Accordingly, the thermally deformed disk 100 cannot be in contact with the entire surface of the brake pad, and one side thereof comes into contact with the brake pad first, thereby generating one-sided wear of the brake pad. Therefore, there occurred limitations in that vibration of the steering wheel and noise are caused when the vehicle is driven, and the brake performance and stability are deteriorated when the vehicle is braked.

According to an embodiment of the present disclosure, a path in which a pair of pad plates 200 and a pair of brake pads slide is adjusted, thereby solving the limitations of the conventional caliper brake.

Figure 3:
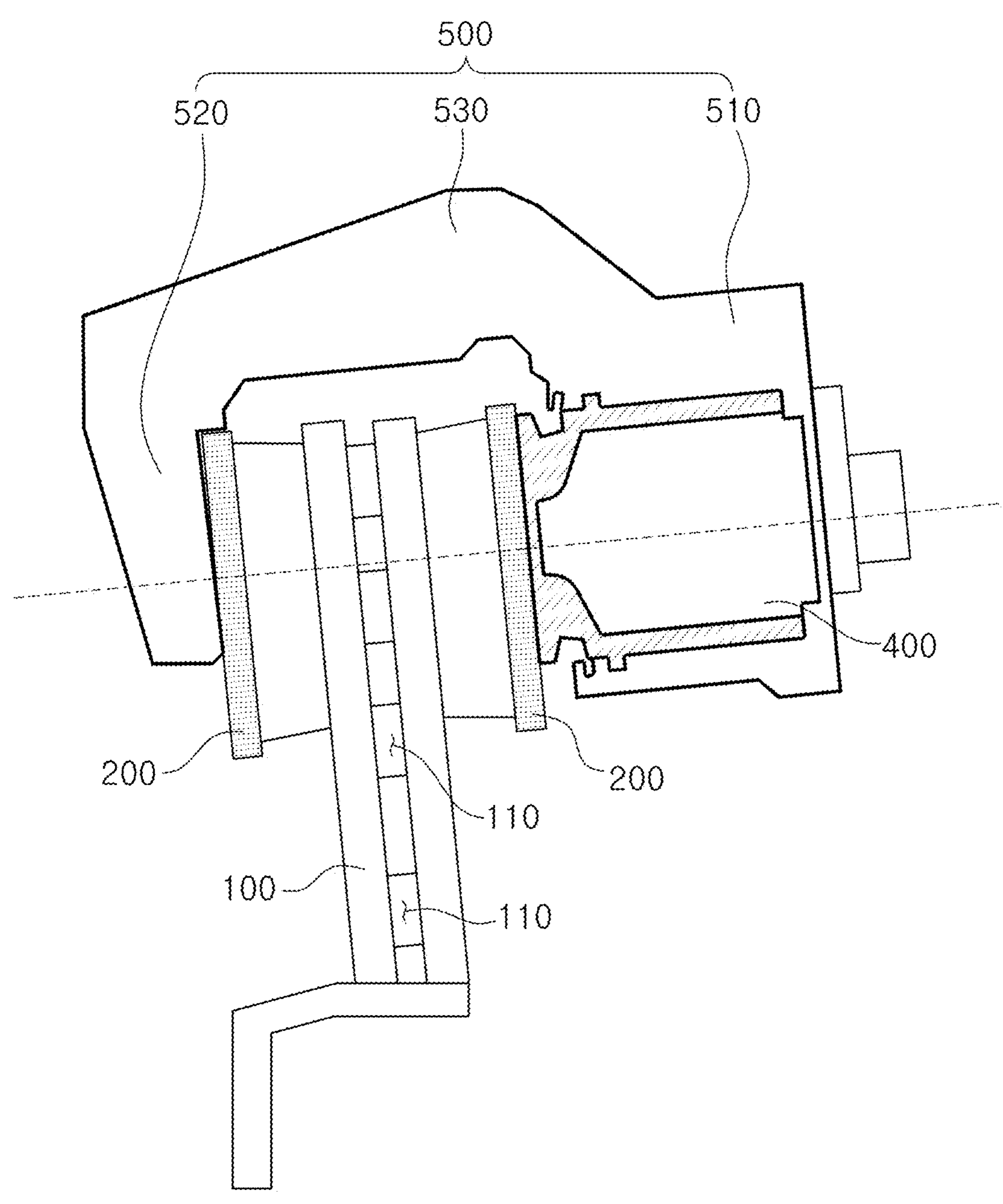
FIG. 3 is a cross-sectional view illustrating a state in which a disk is thermally deformed in the caliper brake according to an embodiment of the present disclosure.

FIG. 3 is a cross-sectional view illustrating a state in which a disk 100 is thermally deformed in the caliper brake according to an embodiment of the present disclosure.

Referring to FIG. 3, the pair of pad plates 200, the pair of brake pads, and a pressing member 400 are disposed to be inclined at a predetermined angle from the x-axis like a dotted line.

The pressing member 400 is disposed to be inclined perpendicular to the pair of pad plates 200 to press the pair of pad plates 200 so that the entire surface of the pair of brake pads is brought into contact with one surface of the thermally deformed disk 100.

In addition, the finger 520 of the caliper housing 500 is disposed to be inclined so that an inner surface thereof in contact with the pad plate 200 is perpendicular to the pair of pad plates 200. In other words, the inner surface of the finger 520 is provided to be perpendicular to the dotted line illustrated in FIG. 3.

Figure 4:
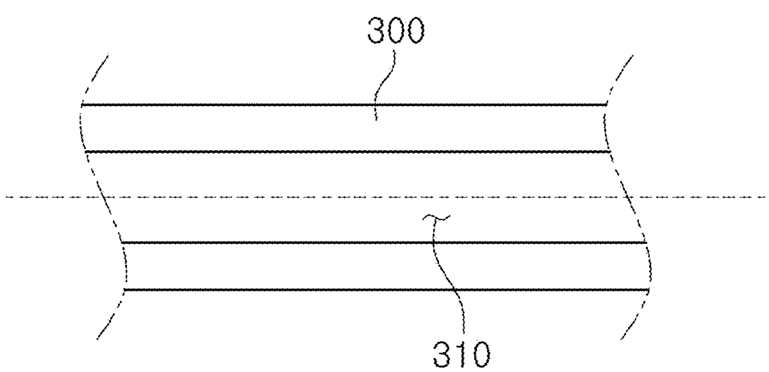
FIG. 4 is an enlarged view illustrating a state in which portion A in FIG. 2 is enlarged from the front.
Figure 5:
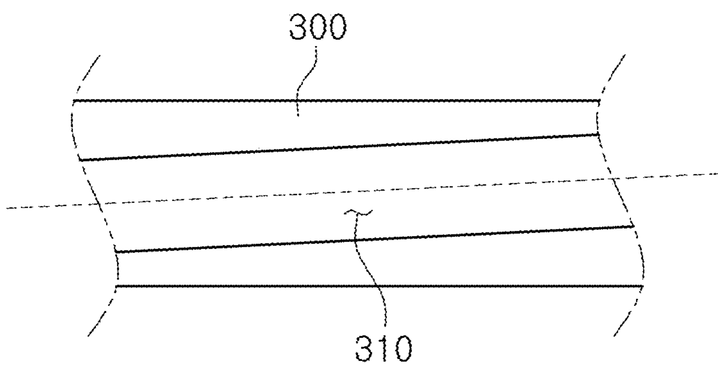
FIG. 5 is an enlarged view illustrating a state in which the same position as portion A in the embodiment of the present disclosure is enlarged from the front.

FIG. 4 is an enlarged view illustrating a state in which portion A in FIG. 2 is enlarged from the front, and FIG. 5 is an enlarged view illustrating a state in which the same position as portion A in the embodiment of the present disclosure is enlarged from the front.

Referring to FIGS. 4 and 5, the slide groove 310 according to the embodiment of the present disclosure is formed to be inclined unlike the slide groove 310 of the conventional caliper brake.

As illustrated in FIG. 4, the dotted line indicated along the center of the slide groove 310 is parallel to the x-axis, the conventional slide groove 310 is formed in a horizontal direction. Accordingly, when the vehicle is braked, the caliper housing 500 slides in a direction opposite to the forward direction of the pressing member 400 with respect to the carrier 300 fixed to the vehicle body, and accordingly, the pair of pad plates 200 and the brake pads installed in the caliper housing 500 move in a horizontal direction in parallel with the x-axis direction to be pressed toward the disk 100 and brought closely into contact with the disk 100.

On the other hand, as the dotted line indicated along the center of the slide groove 310 in FIG. 5 forms a predetermined angle with the x-axis, the slide groove 310 according to the embodiment of the present disclosure is formed to be inclined.

Specifically, the slide groove 310 is recessed to be inclined in a reciprocating direction so that the pair of pad plates 200 are slidable diagonally, and the slide groove 310 is formed to have a height that is lower as a distance from the vehicle body increases and a height that is higher as a distance from the vehicle body decreases. In other words, the height of the slide groove 310 decreases toward the finger 520 of the caliper housing 500, and increases toward the cylinder 510.

For example, an angle formed between the dotted line indicated along the center of the slide groove 310 and the horizontal line may be 2° to 3°. However, the slide groove 310 of the present disclosure is not limited to the embodiment of the present disclosure, and includes all the slide grooves 310 formed in an inclined direction rather than a horizontal direction. That is, an angle formed between the slide groove 310 and the horizontal surface may be appropriately adjusted according to the types of components such as the pressing member 400, the disk 100, and the brake pad provided in the caliper brake.

In the caliper brake according to the embodiment of the present disclosure having the above-described configuration, the slide groove 310 provided in the carrier 300 is inclined, and the surface in contact with the pad plate 200 in the arrangement structure of the pressing member 400 and the finger 520 of the caliper housing 500 is inclined, so that even when the disk 100 is thermally deformed, one surface of the disk 100 may be brought into contact with the entire surface of the brake pad. As a result, the one-sided wear of the brake pad caused by the thermal deformation of the disk 100 is prevented, the shaking of the steering wheel and the noise of the brake are prevented, and thus, the deterioration in the brake performance and stability due to the thermal deformation of the disk 100 is prevented. It is possible to not only improve the productivity and assemblability of a product, but also reduce the costs of the brake and improve the marketability of the vehicle by responding with a simple structure without adding a separate configuration with respect to the thermal deformation of the disk 100.

An aspect of the present disclosure provides the caliper brake that prevents the deterioration in brake performance and stability due to the thermal deformation of the disk.

Another aspect of the present disclosure provides the caliper brake that prevents a noise of the brake caused by the thermal deformation of the disk.

Still another aspect of the present disclosure provides the caliper brake that prevents one-sided wear of brake pads due to the thermal deformation of the disk.

Yet another aspect of the present disclosure provides the caliper brake having a simple structure and improved productivity and assemblability of a product.

Still yet another aspect of the present disclosure provides the caliper brake capable of reducing costs of the brake and improving the marketability of a vehicle.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A caliper brake comprising:

a disk configured to rotate together with a wheel;

a pair of pad plates disposed on both sides of the disk, respectively; and a carrier fixed to a vehicle body and configured to accommodate the pair of pad plates therein, wherein the pair of pad plates comprise protrusions protruding from both side ends thereof, and the carrier comprises a pair of slide grooves recessed from an inner surface to an outer side thereof so that the protrusions are inserted and supported, the pair of slide grooves being recessed to be inclined in a reciprocating direction so that the pair of pad plates are slidable diagonally, wherein the caliper brake further comprises:

a caliper housing provided with a cylinder in which a pressing member is installed to be movable forward and backward, a finger provided to press toward the disk, a first pad plate, among the pair of pad plates, that is disposed at a first predetermined distance from the vehicle body, and a body configured to connect the cylinder to the finger, and wherein a height of the pair of slide grooves decreases in a direction toward the finger of the caliper housing, and increases in a direction toward the cylinder.

2. The caliper brake of claim 1, wherein the pair of slide grooves is provided so that an inclined angle is formed to be 2° to 3° based on a horizontal line.

3. The caliper brake of claim 1, further comprising:

a pressing member configured to press, toward the disk, a second pad plate, among the pair of pad plates, that is disposed at a second predetermined distance from the vehicle body, wherein the second predetermined distance is closer to the vehicle body than the first predetermined distance, and wherein the pressing member is disposed to be inclined perpendicular to the pair of pad plates.

4. The caliper brake of claim 1, wherein the pressing member is configured to press, toward the disk, a second pad plate, among the pair of pad plates, that is disposed at a second predetermined distance from the vehicle body, wherein the second predetermined distance is closer to the vehicle body than the first predetermined distance.

5. The caliper brake of claim 1, wherein the finger is positioned farther from the vehicle body than the cylinder.

6. The caliper brake of claim 1, wherein the disk is provided with at least one heat dissipation hole in a circumferential surface thereof.

* * * * *